(12) United States Patent
Hyatt et al.

(10) Patent No.: US 11,932,480 B2
(45) Date of Patent: Mar. 19, 2024

(54) INTELLIGENT EQUIPMENT SECURITY SYSTEM

(71) Applicant: FEDERAL EXPRESS CORPORATION, Memphis, TN (US)

(72) Inventors: Anthony James Hyatt, Harrison, AR (US); Andrew Charles Jensen, Harrison, AR (US); Hal Wesley Borland, Harrison, AR (US); Dennis Wayne Harner, Harrison, AR (US); Daniel Robert Martin, Nixa, MO (US)

(73) Assignee: FEDERAL EXPRESS CORPORATION, Memphis, TN (US)

( * ) Notice: Subject to any disclaimer, the term of this patent is extended or adjusted under 35 U.S.C. 154(b) by 765 days.

(21) Appl. No.: 17/010,672

(22) Filed: Sep. 2, 2020

(65) Prior Publication Data
US 2022/0063901 A1 Mar. 3, 2022

(51) Int. Cl.
| | |
|---|---|
| H04N 5/44 | (2011.01) |
| B65D 88/12 | (2006.01) |
| G02B 19/00 | (2006.01) |
| G08B 25/00 | (2006.01) |
| H04L 9/40 | (2022.01) |
| H04W 4/021 | (2018.01) |
| H04W 12/63 | (2021.01) |
| H04W 12/65 | (2021.01) |

(52) U.S. Cl.
CPC ......... *B65D 88/12* (2013.01); *G02B 19/009* (2013.01); *G08B 25/007* (2013.01); *H04L 63/107* (2013.01); *H04W 4/021* (2013.01); *H04W 12/63* (2021.01); *H04W 12/65* (2021.01); *B65D 2590/0083* (2013.01)

(58) Field of Classification Search
CPC ............ B65D 88/12; B65D 2590/0083; G02B 19/009; G02B 5/208; G08B 25/007; H04L 63/107; H04W 4/021; H04W 12/63; H04W 12/65; G06Q 10/083; G06Q 10/0833; G06Q 10/087
See application file for complete search history.

(56) References Cited

U.S. PATENT DOCUMENTS

| | | | | |
|---|---|---|---|---|
| 2008/0246598 | A1* | 10/2008 | Brown | G06Q 10/06 340/517 |
| 2013/0154829 | A1* | 6/2013 | Mostov | G08B 25/08 248/213.2 |
| 2017/0363498 | A1* | 12/2017 | Alfrey | B65D 81/052 |
| 2020/0409929 | A1* | 12/2020 | Kodavarti | G06F 16/2365 |

* cited by examiner

*Primary Examiner* — Munear T Akki
(74) *Attorney, Agent, or Firm* — Finnegan, Henderson, Farabow, Garrett & Dunner, LLP

(57) ABSTRACT

An equipment security system includes one or more sensors or optical recording devices disposed on or inside a cargo container. A computing device receives data from the one or more sensors or optical recording devices, determines whether an event has occurred at the cargo container, determines a geofence associated with the cargo container, and selects or configures a dynamic script including instructions that specify whether to begin recording an event occurring at or inside the cargo container, whether to record the event in an overwritable, local memory associated with at least one of the one or more sensors or optical recording devices or the computing device, parameters that govern how data associated with the event will be recorded, and whether to upload the data from the local memory to a remote server.

20 Claims, 3 Drawing Sheets

INTELLIGENT EQUIPMENT SECURITY SYSTEM

TECHNICAL FIELD

The present application relates to a system and method for monitoring and recording events associated with a secured cargo container. More particularly, the present application relates to a system and method for detecting an event at a cargo container and recording the event.

BACKGROUND

Monitoring and tracking of assets during shipment and storage is an important part of commerce. For example, tracking packages and maintaining the security of assets such as transport vehicles, cargo containers, and the cargo contained within the cargo containers is important to organizations of all kinds, whether it be a company keeping track of inventory to be sold in its stores, or a shipper keeping track of packages being transported through its delivery network. To provide secure, quality service, and avoid the loss or damage of valuable assets, an organization may employ security personnel and/or place various locks, tamper-proof seals, and alarms on cargo containers and cargo transport vehicles such as trailer trucks, straight trucks, rail cars, and cargo aircraft.

In addition to tracking packages, parties that ship and receive packages may also need information regarding any events that may have occurred during the shipment and storage of the packages, including attempted thefts or other occurrences that may affect the condition of the packages, such as tampering with the packages or other changes to the packages or the cargo container that may have affected the temperature, humidity, or other environmental conditions items within the container were exposed to during shipment and storage. For example, a shipper may implement additional security protocols for certain types of cargo or cargo located within specific geofences. A shipper may also make other changes to cargo containers to meet specific customer requirements, regulatory requirements, jurisdictional requirements, or to avoid detrimental environmental issues that may affect packages and items within the containers. In some instances, a customer that has ordered a particular, environmentally-sensitive product or high value product may want to monitor the security, temperature, humidity, and other characteristics or attributes affecting the contents of a cargo container, for example, to determine if items within the container have been tampered with, or if the temperature and/or humidity that the items were exposed to goes above or below a set range. Likewise, the party that ships the package may also want to monitor the conditions affecting a particular cargo container for insurance purposes and to ensure that the contents arrive at their destination in the proper condition.

Technological advances have enabled items to be tracked in ways that exceed the functionality of a simple list. A rich information framework now can be applied to describe each shipped item's interaction with its surroundings, such as any events that may have occurred affecting a cargo container or an item contained within the cargo container during transportation and custodial handoffs.

Bar codes are one way organizations keep track of items. A retailer, for example, may use bar codes on items in its inventory. For example, items to be sold in a retailer's store may each be labeled with a different bar code. In order to keep track of inventory, the retailer typically scans the bar code on each item. In addition, when an item is sold to a consumer, the bar code for that item is scanned.

Similarly, a shipper may utilize bar codes by associating a bar code with packages to be delivered to a recipient. For example, a package may have a bar code corresponding to a tracking number for that package. Each time the package goes through a checkpoint (e.g., the courier taking initial control of the package, the package being placed in a cargo container, the cargo container being placed on a transport vehicle, the cargo container being placed in a storage facility, the cargo container arriving at a destination, a package from the cargo container being delivered to the recipient, etc.), bar codes associated with a cargo container and/or with packages contained within the cargo container may be scanned. Bar codes, however, have the disadvantage that personnel must manually scan each bar code on each item in order to effectively track the items.

Radio-frequency identification (RFID) tags are an improvement over typical bar codes. RFID tags do not require manual scanning that is required by typical bar codes. For example, a RFID tag on an inventory item or on a particular cargo container carrying multiple inventory items may be able to communicate with an electronic reader that detects containers or items, for example, at a storage facility, a warehouse, or in a shopping cart at a retail establishment, and adds information such as the cost of each item contained in the cargo container, the total weight of the cargo container, special requirements for the items, a final destination for the cargo container, the shipper, the ultimate customer, or other information useful to a shipper, intermediary, wholesale distributor, retail establishment, or retail consumer. RFID tags have been used to track things such as livestock, railroad cars, trucks, and even airline baggage. These RFID tags typically only allow for basic tracking and do not provide a way to improve asset management using information about the environment and other events, conditions, and occurrences that particular cargo containers and items contained within the cargo containers are subjected to during the shipping and storage processes.

SUMMARY

A sensor-based tracking and monitoring system such as an equipment or cargo container security monitoring system according to various embodiments of this disclosure may provide even more useful information than RFID systems. Shippers, carriers, government agencies such as Customs and Border Protection (CBP), Department of Homeland Security (DHS), wholesale distributors, recipients, end customers, and other parties may wish to know the location, security, condition, and integrity of shipments before, during, and after transport to satisfy security protocols, quality control goals, regulatory requirements, and optimize business processes. To address these requirements, a system and method according to various embodiments and implementations of this disclosure may include various sensors and/or optical recording devices equipped and disposed to monitor and transmit data regarding cargo containers and shipments and present this data to a user, back office server, client device, or mobile device in real-time or near real-time, and/or selectively record specific, predetermined periods and types of data in an overwritable, local memory or buffer, and automatically upload relevant periods of the data to the cloud and/or a remote, back office server. Reference to "sensors" herein may include optical recording devices such as cameras. Shippers, carriers, government agencies, recipients, and other parties may have similar information needs during shipment, but one or more of the parties may have privacy or regulatory requirements that prevent them from sharing all of the information available from a monitoring system. To address these requirements, a system according to various embodiments of this disclosure may allow parties to specify what information they will share with other parties, including the frequency and timeliness of information updates. The system may compare information requirements from parties involved in a shipment and notify parties when conflicts exist and allow parties to adjust information sharing policies to address these conflicts.

In one aspect of this disclosure, an equipment security system may include a remote server and a monitoring system that is configured to monitor a cargo container. The monitoring system may include one or more sensors disposed on or inside the cargo container and configured to sense attributes of at least one of the container, cargo within the container, or an area that is one of inside the container or within a predetermined distance from the container, and an onboard computer mounted on or in close proximity to the cargo container. At least one of the remote server or the onboard computer may be configured to receive data communications from the one or more sensors or optical recording devices, and based on the data communications, determine whether an event has occurred at the cargo container, and determine a geofence associated with the cargo container. A dynamic script may be selected or configured based on at least one of a determination of whether an event has occurred, whether the cargo container is located within the determined geofence, or a type of data received from the one or more sensors or optical recording devices. The dynamic script may include software instructions that specify whether to begin recording an event occurring at or inside the cargo container, specify whether to record the event in an overwritable, local memory associated with at least one of the one or more sensors or the onboard computer, specify parameters that govern how data associated with the event will be recorded, and specify whether to upload the data from the local memory to the remote server.

In another aspect of this disclosure, a cargo container security system may include a back office server, one or more sensors or optical recording devices disposed on or inside the cargo container and configured to sense attributes of at least one of the container, cargo within the container, or an area that is one of inside the container or within a predetermined distance from the container, an onboard computer disposed in association with the cargo container, and one or more client devices or mobile devices communicatively coupled to at least one of the one or more sensors, optical recording devices, the onboard computer, or the back office server. At least one of the onboard computer, the back office server, or the one or more client devices or mobile devices may be configured to receive data communications from the one or more sensors or optical recording devices, and based on the received data communications, determine whether an event has occurred at the cargo container, and determine a geofence associated with the cargo container. A dynamic script may be selected or configured based on at least one of a determination of whether an event has occurred at the cargo container, the determined geofence, or a type of data received from the one or more sensors or optical recording devices. The dynamic script may include software instructions that specify whether to begin recording an event occurring at or inside the cargo container, specify whether to record the event in an overwritable, local memory associated with at least one of the one or more sensors or optical recording devices, the onboard computer, or the one or more client devices or mobile devices, specify parameters that govern how data associated with the event will be recorded, and specify whether to upload the data from the overwritable, local memory to the back office server.

In still another aspect of this disclosure, a method is provided for monitoring a cargo container, wherein one or more sensors are disposed on or inside the cargo container and configured to sense attributes of at least one of the container, cargo within the container, or an area that is one of inside the container or within a predetermined distance from the container, and a computing device is communicatively coupled with the one or more sensors or optical recording devices. The method may include receiving, at the computing device, data communications from the one or more sensors, based on the received data communications, determining, with the computing device, whether an event has occurred at the cargo container, determining, with the computing device, a geofence associated with the cargo container, and based on at least one of a determination of whether an event has occurred at the cargo container, the determined geofence, or a type of data received from the one or more sensors or optical recording devices, performing at least one of selecting or configuring a dynamic script using the computing device. The dynamic script may include software instructions that specify whether to begin recording an event occurring at or inside the cargo container, specify whether to record the event in an overwritable, local memory associated with at least one of the one or more sensors, or the computing device, specify parameters that govern how data associated with the event will be recorded, and specify whether to upload the data from the overwritable, local memory to a remote server.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
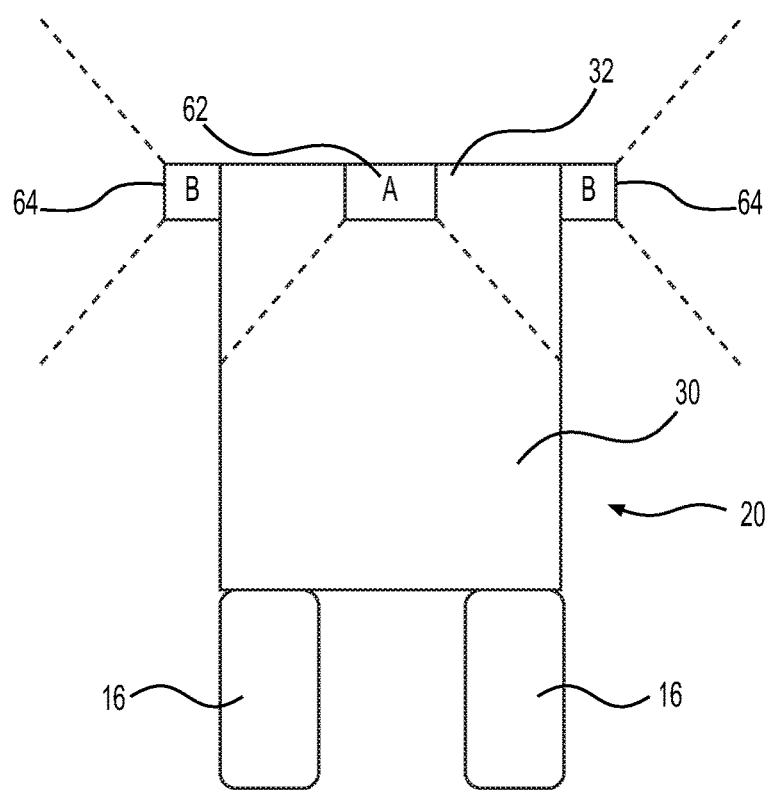
FIG. 1 illustrates an exemplary implementation of an equipment security system according to this disclosure.
Figure 2:
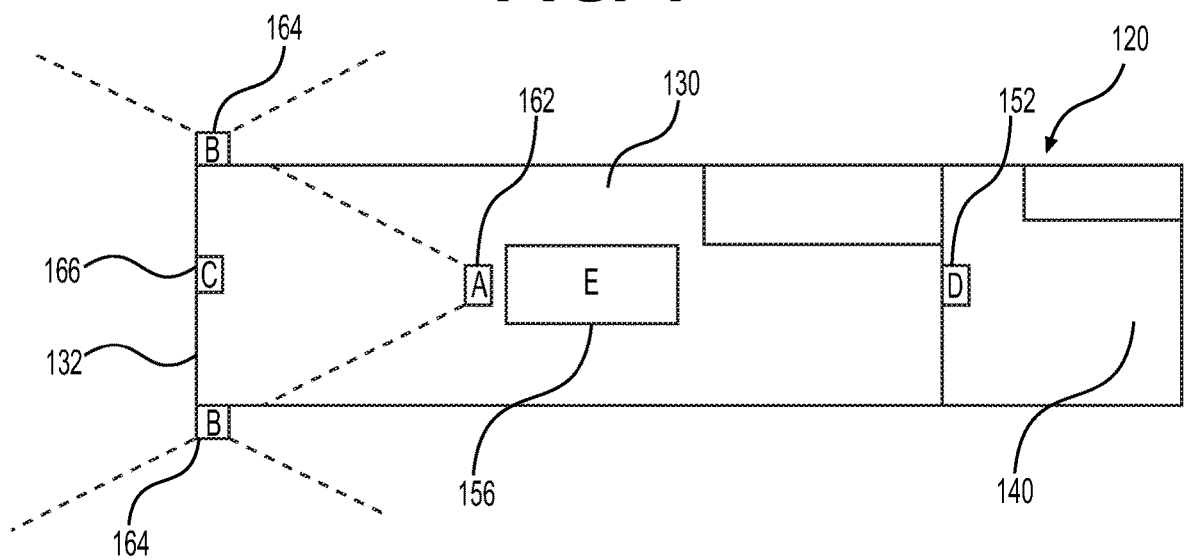
FIG. 2 illustrates an exemplary implementation of an equipment security system according to this disclosure.
Figure 3:
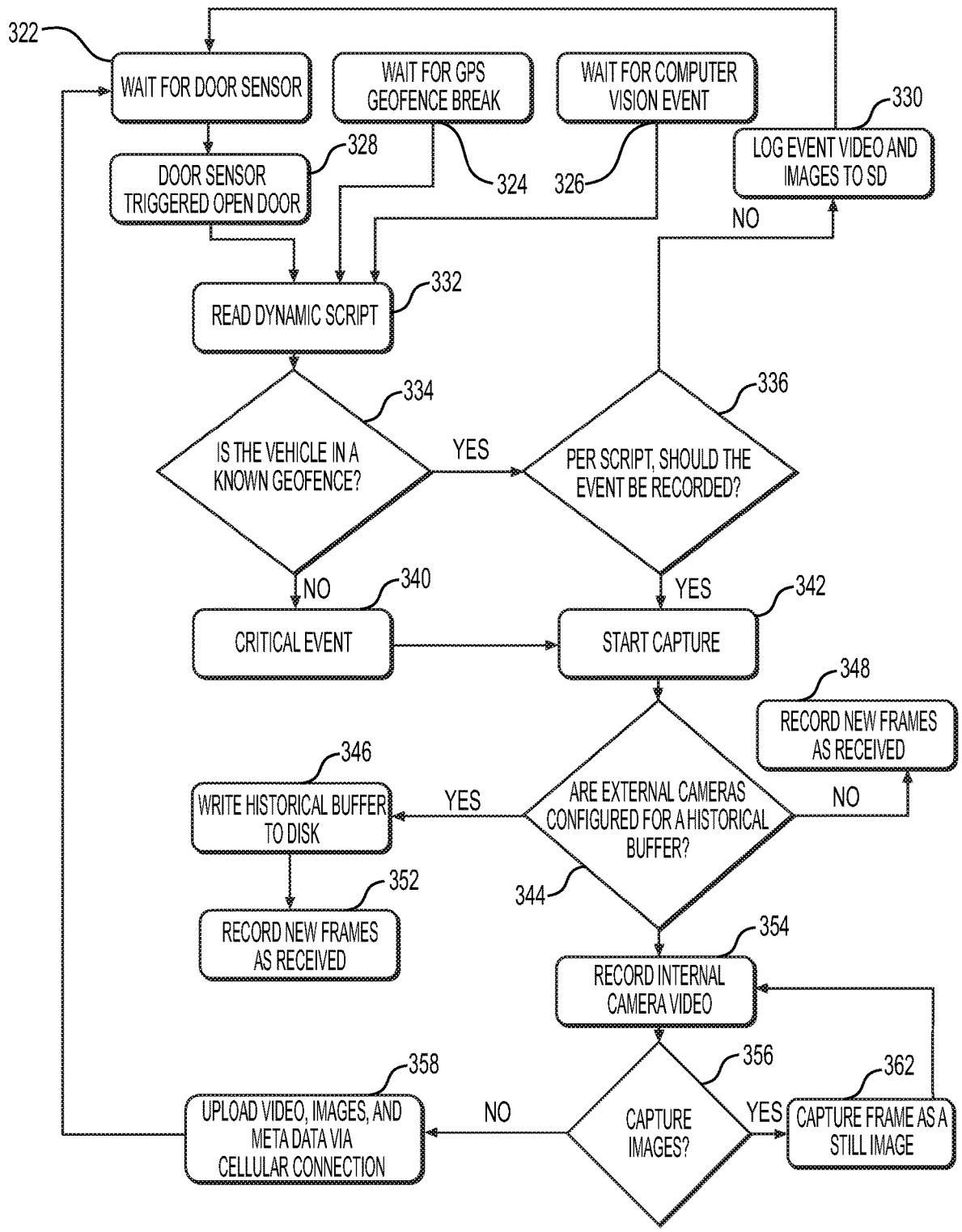
FIG. 3 illustrates a flowchart of an exemplary method of implementing an equipment security system according to this disclosure.
Figure 4:
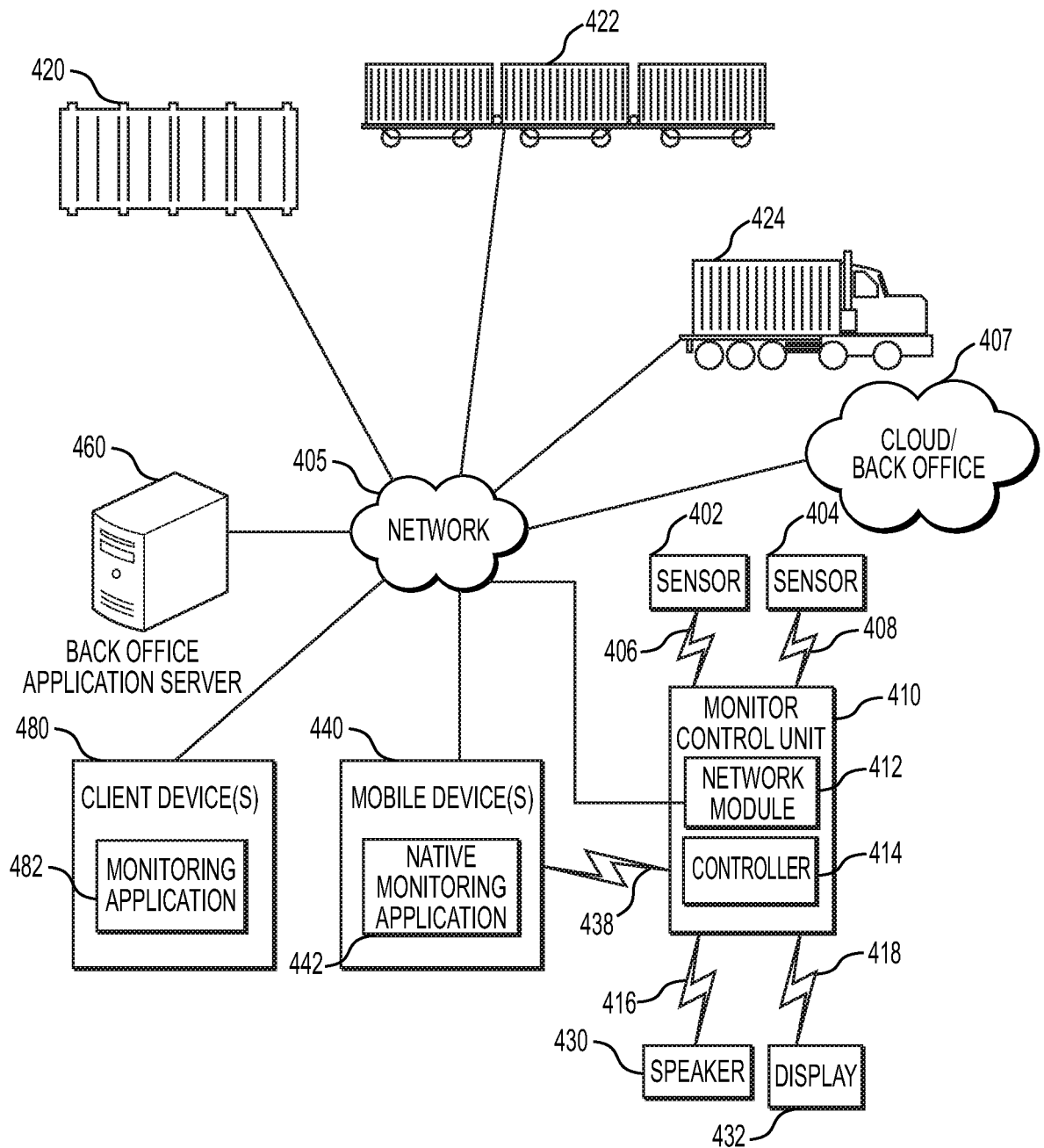
FIG. 4 illustrates a schematic diagram of an equipment security system according to this disclosure.

FIG. 1 illustrates an exemplary setup of some hardware components for an equipment or cargo container security system according to an exemplary embodiment of this disclosure, as shown in a rear view of a trailer 20 of a tractor-trailer truck used in transporting cargo. FIG. 2 illustrates an exemplary setup of some hardware components for an equipment or cargo container security system according to an exemplary embodiment of this disclosure, as shown in an overhead view of a tractor-trailer truck 120. FIG. 3 is a flowchart showing an exemplary method of monitoring equipment such as a cargo container according to an exemplary implementation of this disclosure. FIG. 4 is a schematic diagram of an exemplary equipment or cargo container security system according to an exemplary embodiment of this disclosure.

As shown in FIGS. 1, 2, and 4, an equipment or cargo container security system according to this disclosure may include a remote server 460, and a monitoring system that is configured to monitor equipment, such as a cargo container 420, 422, 424. The monitoring system may include, for example, one or more sensors and/or optical recording devices 402, 404 disposed on, inside, or in close proximity to the cargo container 420, 422, 424 and configured to sense attributes of at least one of the cargo container, cargo within the container, or an area that is one of inside the container or within a predetermined distance from the container. An exemplary cargo container for which the equipment or cargo container security system could be implemented might include, for example, a standard cargo shipping container 420, such as may be transported by ship from a loading location or originating port to a destination port, a box car or other freight rail car of a train 422, the trailer of a tractor-trailer truck 120, 424, the box compartment of a straight truck, a cargo container that could be loaded on cargo aircraft, or cargo aircraft. Sensors and/or optical recording devices 402, 404 may include one or more wide angle lens cameras 64, 164, or other optical recording devices externally mounted on the cargo container or disposed in close proximity to the cargo container and configured to capture image and video data of activity in the vicinity of the container, an IR-CUT camera 62, 162 (an infrared camera with a filter that can selectively block infrared light) mounted inside the cargo container and configured to capture image and video data under a wide range of lighting conditions, and a door sensor 162 or other proximity or motion sensor configured to detect the opening or movement of a door to the cargo container.

An onboard computer or monitor control unit 152, 410 may be mounted on or in close proximity to the cargo container. For example, in the case of tractor-trailer 120 of FIG. 2, onboard computer 152 may be mounted inside the cab of the truck. In other applications, an "onboard" computer or monitor control unit may refer to a computing device housed in a protective enclosure and mounted inside of the cargo container or otherwise disposed in close proximity to the cargo container. At least one of the remote server (such as a back office server) 460 or the onboard computer or monitor control unit 152, 410 may be configured to receive data communications from the one or more sensors and/or optical recording devices, and based on the received data communications, determine whether an "event" has occurred at the cargo container. An "event," as defined in this disclosure, may include any activity or occurrence inside or in the vicinity of the cargo container, only select, predetermined types of activity, the presence of objects or humans inside or in the vicinity of the cargo container, and/or the detection of environmental characteristics or other attributes, such as radiation above threshold levels, temperatures above or below threshold levels, smoke, the detected presence of explosives or biohazards, or the detection of other potential risk factors inside or in the vicinity of the cargo container. The term "event" is also used herein to include information reflecting or associated with the above-described activities or occurrences.

The remote server 460 or onboard computer or monitor control unit 152, 410 may be configured to determine a geofence associated with the cargo container. A geofence is a virtual perimeter that may be predetermined for a real world geographic area. For example, predetermined geofences may include freight yards, shipping ports, truck depots, shipping facilities, warehouses, customer facilities, loading zones, airports, highways, rural roads, and geographic zones such as dark territories along railways where trains are not controlled by signals. Location of a cargo container in a particular geofence may be associated with characteristics such as a heightened security risk for a cargo container or the cargo in the container, the potential for increased environmental stresses on the cargo contained with the cargo container, such as when crossing mountain ranges or entering other high elevation areas, or areas requiring heightened surveillance and/or inspections for regulatory reasons, such as border crossings, or other areas where there is increased activity around the container or the potential for security risks. Therefore, the presence of a cargo container in a particular geofence may justify a change in the frequency, period, and types of data that may be recorded in an overwritable, local memory associated with the sensors and/or optical recording devices disposed on the cargo container. Additionally or alternatively, presence of a cargo container in a predetermined geofence may dictate whether sensor data that is being continually or periodically recorded in an overwritable, local memory, circular buffer, or historical buffer associated with the sensors and/or optical recording devices may be periodically or continually uploaded to a remote or back office server. The uploading of data from an overwritable, local memory or memories to a remote or back office server may be performed over the "cloud," or an interconnected network of remote computers using Internet data transfer protocols, or over cellular, WiFi, or other networks.

The data obtained by the various sensors and/or optical recording devices disposed on, inside, or in the vicinity of a cargo container may be temporarily recorded for periods of time and continually overwritten in an overwritable, local memory (or circular or historical buffer) associated with the various sensors and/or optical recording devices, or periodically transmitted from one or more local memories to a remote server, client device, or other mobile device associated with the equipment or cargo container security system. One or more GPS devices and cellular devices or other transceiver devices may be associated with the onboard computer or monitor control unit 152, 410, and may be configured to determine, transmit, and/or receive a geographic location of the cargo container. The remote server 460 or onboard computer or monitor control unit 152, 410 may also select or configure a dynamic script based on at least one of a determination of whether an event of a particular type or an event having predetermined characteristics has occurred, whether the cargo container is located within a predetermined geofence, or whether a particular type of data has been received from the one or more sensors and/or optical recording devices. A "dynamic script" according to this disclosure may be defined and implemented by computing hardware, firmware, software, or any combination of hardware, firmware, and/or software, such as may be embodied in one or more processors and associated memories.

In some embodiments, an optical recording device, such as an IR-CUT camera, may subject the data recorded by the device to computer analytics or other machine learning techniques in order to identify to a high level of certainty any particular object, human being, or activity that may present specific security concerns. The dynamic script may include software instructions that specify whether to begin recording an event occurring at, inside of, or in the vicinity of the cargo container, based at least in part on an identification of a particular type, frequency, or period for data acquired by the sensors or optical recording devices. The instructions of the dynamic script may also specify whether to record the event in an overwritable, local memory associated with at least one of the one or more sensors or optical recording devices or the onboard computer, specify parameters that govern how data associated with the event will be recorded, and specify whether and when to upload the data from the local memory to the remote server. Additionally, the dynamic script may specify particular metadata associated with any recorded data that is also uploaded to a remote or back office server. The metadata may include a GPS location or geofence for the equipment or cargo container at the time of the upload of the sensor data, a customer and/or shipper identification, a timestamp, etc.

At least one of the remote server, the onboard computer, or one or more client devices or mobile devices of the equipment or cargo container security system according to various embodiments of this disclosure may also include a monitoring application configured to track and report geographic location data associated with the cargo container and whether the cargo container is located within a predetermined geofence. Client devices may include personal computers, laptop computers, tablets, or other computing devices able to access monitoring applications and application interfaces authorized to monitor particular cargo containers being tracked by particular shippers or customers. Mobile devices may similarly include portable personal computing devices such as cell phones that are able to download and access a monitoring application with particular password protected capabilities to monitor particular cargo containers that are transporting products purchased or shipped by a particular user. The ability to upload sensor and/or optical recording data to one or more client devices or mobile devices in addition to or alternatively to uploading the data to a remote, back office server may provide redundancy and enable more rapid response times whenever events of particular concern are detected. In some embodiments of this disclosure, instructions to upload sensor and/or optical recording data to the one or more client devices or mobile devices may depend on the physical proximity of the client devices or mobile devices to a particular cargo container.

FIG. 4 illustrates an example of an equipment or cargo container security system according to this disclosure that is configured to provide moving asset location tracking and security monitoring using various computing devices such as a remote, back office server 460, an onboard computer or monitor control unit 410, one or more client devices 480, and one or more mobile devices 440. The security system may be associated with a network 405 and various moving assets 420, 422, 424. In some examples, the network 405 facilitates communications between the monitor control unit 410, the one or more mobile devices 440, the remote, back office server 460, the moving assets 420, 422, 424, and the one or more client devices 480.

The network 405 may be configured to enable exchange of electronic communications between devices connected to the network 405. For example, the network 405 may be configured to enable exchange of electronic communications between the monitor control unit 410 (onboard computer), the one or more mobile devices 440, the remote server 460, and the one or more client devices 482. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitor control unit 410 (onboard computing device) may include a network module 412, and a controller 414. The controller 414 may be configured to control the equipment security system, including configuring and/or selecting dynamic script that dynamically defines what actions are to be taken based on various sensor inputs. In some examples, the controller 414 may include one or more processors or other control circuitry configured to execute instructions of a program that controls operation of the equipment or cargo container security system. In these examples, the controller 414 may be configured to receive input from sensors, optical recording devices, detectors, or other devices included in the equipment or cargo container security system, and control operations of the devices. For example, the controller 414 may be configured to control operation of the network module 412 included in the monitor control unit 410.

The network module 412 may be a communication device configured to exchange communications over the network 405. The network module 412 may be a wireless communication module configured to exchange wireless communications over the network 405. For example, the network module 412 may be a wireless communication device configured to exchange communications over a wireless data channel and a wireless voice channel. In this example, the network module 412 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM, GPRS, TDMA, CDMA, HSCSD, EDGE or EGPRS, EV-DO or EVDO, UMTS, or IP.

The network module 412 also may be a wired communication module configured to exchange communications over the network 405 using a wired connection. For instance, the network module 412 may be a modem, a network interface card, or another type of network interface device. The network module 412 may be an Ethernet network card configured to enable the monitor control unit 410 to communicate over a local area network and/or the Internet. The network module 412 also may be a voiceband modem configured to enable an alarm panel to communicate over the telephone lines of Plain Old Telephone Systems (POTS).

The equipment security system according to various embodiments of this disclosure may include the monitor control unit 410 communicatively coupled to one or more sensors and/or optical recording devices 402, 404, or other detectors. The sensors and/or optical recording devices 402, 404 may include a proximity sensor, a contact sensor, a motion sensor, an audio sensor such as a glass break sensor, a wide angle lens camera, an IR-CUT camera, or any other type of sensor or optical recording device suitable for use in an alarm system or security system. The sensors and/or optical recording devices 402, 404 also may include an environmental sensor, such as a temperature sensor, a water sensor, a rain sensor, a wind sensor, a light sensor, a smoke detector, a carbon monoxide detector, a radiation detector, an air quality sensor, etc. In some examples, the sensors and/or optical recording devices 402, 404 may include a radio-frequency identification (RFID) sensor that identifies a particular container or article contained within the container that includes a pre-assigned RFID tag. In addition, the sensors and/or optical recording devices 402, 404 may include a video/photographic camera, X-ray camera, infrared camera, IR-CUT camera, or other type of optical sensing device configured to capture images or video in different wavelengths of light, and may include an energy consumption sensor for appliances and devices that may consume power in a cargo container monitored by the equipment security system.

As shown in FIG. 4, the sensors and/or optical recording devices 402, 404 may communicate with the controller 414 of monitor control unit 410 (onboard computer) over communication links 406 and 408. The communication links 406, 408 may include one or more wired or wireless data pathways configured to transmit signals from the sensors 402, 404 to the controller 414. The sensors and/or optical recording devices 402, 404 may continuously transmit sensed data to the controller 414, periodically transmit sensed data to the controller 414, or transmit sensed data to the controller 414 in response to a change in a sensed value or in accordance with specific instructions provided by a dynamic script that may be uploaded or downloaded to monitor control unit 410 and controller 414. In some implementations one or more sensors or optical recording devices 402, 404 may include one or more overwritable, local memories, which may form circular or historical buffers for continuously recording data received from the sensors or optical recording devices, and then overwriting the recorded data after predefined periods of time.

The dynamic script may include software instructions, which may be specifically configured in accordance with a particular shipper's or customer's requirements, or in accordance with other requirements, regulations, or standards, may also be manually loaded onto monitor control unit 410, automatically downloaded from back office server 460 over network 405, and/or uploaded or downloaded to client devices 480 and/or mobile devices 440. In some embodiments, monitor control unit 410 may communicate over a communication link 438 directly to a client device 480 or mobile device 440 that is located in close proximity to or at a distance less than a threshold distance from the monitor control unit 410. The version of software instructions included with the dynamic script uploaded or downloaded to the monitor control unit 410 (onboard computer) may be periodically automatically checked and updated by a signal sent to the monitor control unit 410 over the network 405 from a remote or back office server 460. Updates to the dynamic script may also be communicated automatically to the onboard computer. Such automatic updates may ensure that various, widely dispersed cargo containers equipped with security monitoring systems according to various embodiments of this disclosure are always up to date in terms of the features and characteristics offered by the security monitoring systems employed across all assets of a particular shipper.

The controller 414 of monitor control unit (onboard computer) 410 may receive signals from the sensors and/or optical recording devices 402, 404 and detect an event based on the sensed values. For example, a sensor may include a contact sensor provided on a door to a cargo container and the communication link 406 may be a wireless connection between the sensor 402 and the controller 414. In this example, the sensor 402 may sense that the door to the cargo container has been opened (e.g., absence of a connection between contacts included as part of the sensor) and wirelessly transmit data over communication link 406 to the controller 414 indicating that the door has been opened. The controller 414 may receive the data from the sensor 406 over the communication link 406 and determine that an event (e.g., the door opened) has occurred based on the signal from the sensor 402. The controller 414 may control operation of an alarm system, in addition to writing a period of prerecorded data received from a historical buffer (overwritable, local memory) starting before the determined event and ending a period of time after the event begins to a local hard drive or other memory, and/or uploading the recorded data to a remote or back office server.

In some embodiments, the equipment security system may include a speaker 430 and/or a display 432. The speaker 430 may include an electromechanical transducer that converts an electrical signal into sound. The speaker 430 may receive an electrical signal from the controller 414 and produce an audible output based on the electrical signal. For example, the controller 414, in response to detecting an alarm event, may send a signal to the speaker 430 to cause the speaker to produce an audible alarm sound. The speaker 430 also may output audio messages (e.g., audio advertisements, broadcast audio alerts, etc.). In another example, the controller 414 may send a signal representative of a voice communication to the speaker 430 to cause the speaker to produce an audible output of the voice communication.

The equipment security system according to various exemplary embodiments of this disclosure may also include a display 432. The display 432 may be any type of electronic display configured to render a visually perceivable display of information (e.g., an LCD display, a plasma display, a television, a computer monitor, a display on a cell phone, etc.). The display 432 may be integrated in the monitor control unit 410 (e.g., control panel) or may be separate from the monitor control unit 410 (e.g., a separate display provided as part of the equipment security system, a television, a computer monitor, etc. that is not part of the equipment security system, but a device with which the equipment security system may communicate). The display 432 may be used to depict the current state of the equipment security system. The display 432 also may be used to display current electronic content useful to a user, such as the current version of the dynamic script that is being implemented by the controller 414, whether data is being transferred from an overwritable, local memory to a back office server or to a client device or mobile device, and whether a particular type of event has occurred at the cargo container.

The remote or back office server 460 is an electronic computing device configured to provide monitoring services by exchanging electronic communications with at least one of the monitoring system control unit (onboard computer)

410, the one or more mobile devices 440, and the one or more client devices 480 over the network 405. For example, the remote, back office server 460 may be configured to monitor events identified and recorded by the monitor control unit 410. In this example, the remote server 460 may exchange electronic communications with the network module 412 included in the monitor control unit 410 to receive information regarding events detected by the various sensors and/or optical recording devices 402, 404 and monitor control unit (onboard computer) 410. Additionally or alternatively, the remote, back office server 460 may receive information regarding events detected by sensors and/or optical recording devices 402, 404 from the one or more mobile devices 440 or the one or more client devices 480 transmitted over the network 405.

The back office server 460 may store sensor and/or optical recording device data received from the monitoring system (e.g., geographic locations of cargo containers, an opening of a door to a cargo container, an entry of a human into a cargo container—e.g., as determined by an IR-CUT camera in conjunction with computer analytics, or other activity, environmental characteristic, or events occurring in or around a cargo container) and perform analysis of the sensor data received from the monitoring system. Based on the analysis, the remote, back office server 460 may communicate with and control aspects of the monitor control unit (onboard computer) 410, the one or more mobile devices 440, and/or the one or more client devices 480.

The one or more mobile devices 440 may be devices that host and display user interfaces and that host one or more native applications (e.g., the native monitoring application 442). The one or more mobile devices 440 may be cellular phones or non-cellular locally networked devices with displays. The one or more mobile devices 440 may include a cell phone, a smart phone, a tablet PC, a personal digital assistant ("PDA"), or any other portable device configured to communicate over a network and display information. For example, implementations may also include electronic organizers, cellular phones, or other electronic communication devices, and handheld or portable electronic devices for communications, and/or data organization. The one or more mobile devices 440 may be the same or may include mobile devices of different types. The one or more mobile devices 440 may also perform functions unrelated to the equipment security system, such as placing personal telephone calls, playing music, playing video, displaying pictures, browsing the Internet, maintaining an electronic calendar, etc.

The one or more mobile devices 440 may communicate with and receive monitoring system data from the monitor control unit (onboard computer) 410 using the communication link 438. For instance, the one or more mobile devices 440 may communicate with the monitor control unit 410 using various local wireless protocols such as wifi, Bluetooth, zwave, zigbee, HomePlug (ethernet over powerline), or wired protocols such as Ethernet and USB, to connect the one or more mobile devices 440 to local security and automation equipment. The one or more mobile devices 440 may connect locally to the equipment security system and its associated sensors and/or optical recording devices. The local connection may improve the speed of status and control communications when communicating through the network 405 with a remote, back office server 460 may be significantly slower.

Although the one or more mobile devices 440 are shown as communicating with the monitor control unit 410, the one or more mobile devices 440 may communicate directly with the sensors and/or optical recording devices controlled by the monitor control unit 410. In some implementations, the one or more mobile devices 440 may replace the monitor control unit (onboard computer) 410 and perform the functions of the monitor control unit 410 for local monitoring and long range/offsite communication. The dynamic script with a changeable configuration for controlling the type of sensor data recorded locally and/or remotely, and the period and frequency of the data that is recorded and uploaded to the remote server depending on parameters such as the geofence where the cargo container is located or the type of event that is detected, may be downloaded to the one or more mobile devices 440 or client devices 480.

In other implementations, the one or more mobile devices 440 may receive equipment security system data captured by the monitor control unit 410 through the network 405. The one or more mobile devices 440 may receive the data from the monitor control unit 410 through the network 405 or the remote, back office server 460 may relay data received from the monitor control unit 410 to the one or more mobile devices 440 or client devices 480 through the network 405. In this regard, the remote, back office server 460 may facilitate communication between the one or more mobile devices 440, the one or more client devices 480, and the equipment security system.

In some implementations, the one or more mobile devices 440 may be configured to switch whether the one or more mobile devices 440 communicate with the monitor control unit 410 directly (e.g., through link 438) or through the remote server 460 (e.g., through network 405) based on a location of the one or more mobile devices 440 or client devices 480. For instance, when the one or more mobile devices 440 are located close to the monitor control unit 410 and in range to communicate directly with the monitor control unit 410, the one or more mobile devices 440 may use direct communication. When the one or more mobile devices 440 are located far from the monitor control unit 410 and not in range to communicate directly with the monitor control unit 410, the one or more mobile devices 440 may use communication through the remote, back office server 460 to communicate with the monitor control unit 410.

Although the one or more mobile devices 440 are shown as being connected to the network 405, in some implementations, the one or more mobile devices 440 are not connected to the network 405. In these implementations, the one or more mobile devices 440 may communicate directly with one or more sensors and/or optical recording devices 402, 404, and no network (e.g., Internet) connection or reliance on remote servers is needed. The one or more mobile devices 440 may each include a native monitoring application 442, and the one or more client devices 480 may each include a monitoring application 482. The native monitoring application 442 refers to a software/firmware program running on the corresponding mobile device that enables the user interface and features described below. The one or more mobile devices 440 may load or install the native monitoring application 442 based on data received over a network or data received from local media. The native monitoring application 442 may run on mobile devices platforms, such as iPhone, iPod touch, Blackberry, Google Android, Windows Mobile, etc.

As shown in FIG. 4, the equipment or cargo container security system according to various embodiments of this disclosure may include moving assets 420, 422, 424. The moving assets may include various cargo containers such as a standard shipping container 420, a rail car 422, or a tractor trailer truck 424, which may each be outfitted with a device that reports location remotely back to the native monitoring application 442, using long-range communication protocols such as cellular (CDMA, GSM, LTE, etc.), WiMax, satellite, etc., or through local or mesh networks, such as wifi, zigbee, zwave, Bluetooth, etc. Other types of moving assets may be monitored and moving assets may include any objects that may be moved and tracked. Although FIG. 4 illustrates three moving assets, actual implementations may include more (and, perhaps, many more) or fewer moving assets or cargo containers.

The native monitoring application 442 enables a user to perceive the location of the moving assets 420, 422, 424 using the one or more mobile devices 440 in real time. The native monitoring application 442 may also track the mobile device's physical location using GPS and/or other location protocols built into mobile device. The native monitoring application 442 shows the current location of the moving assets such as cargo containers 420, 422, 424 and a current location of each monitored cargo container may be illustrated on a visual map displayed by the native monitoring application 442. In some implementations according to this disclosure, the visual map may be interactive and respond to user input. The native monitoring application 442 may provide access to the multiple moving assets through a single interface.

In some implementations, the native monitoring application 442 may enable users to create and modify allowed geographic areas (geofences) through the native monitoring application 442. The native monitoring application 442 may provide an alert (e.g., email/text alerts) when one or more of the moving assets 420, 422, 424 goes outside of an allowed geographic area ("geofence").

The native monitoring application 442 also may create trigger locations. For instance, if one or more of the moving assets (cargo containers) 420, 422, 424 gets within a threshold distance of a trigger location ("off-limit locations"), the native monitoring application 442 may provide an alert (e.g., email/text alerts). An "off-limit" location may be a defined geographic area (geofence) or a type of location. For example, the native monitoring application 442 may define a particular route that a tractor trailer truck transporting particular cargo may travel, or that a train pulling a monitored box car may travel. In another example, the native monitoring application 442 may define geofences within which historical data reveals higher rates of tampering with cargo containers, theft, or other problems for cargo. In these instances, the native monitoring application 442 may select or configure a dynamic script including software instructions that increase the frequency and/or period at which sensor data is recorded locally and/or uploaded to a remote server.

The native monitoring application 442 may select and/or reconfigure dynamic scripts with software instructions that specify changes to the period of time before an event is identified and after the event begins for capture of sensor data and/or recordation of images and/or video. For example, historical evidence may reveal that useful information may be gleaned from sensor data and/or images or video captured during a 30 second period before an event is identified and during a 60 second period after the beginning of the event. In this case, a dynamic script may be selected or configured to include software instructions to retain the data from such a 90 second period locally in an overwritable, local memory or historical buffer, and then to upload that period of data from the local memory to the remote, back office server for further analysis. The dynamic script may include software instructions that specify exactly what action is to be taken based on factors such as a particular geofence in which a cargo container is located, the various sensor inputs obtained during a predefined period of time, the type of cargo container and/or cargo that is being transported, and other regulatory and/or environmental considerations.

In some embodiments of the present disclosure the native monitoring application 442 of a mobile device 440, the monitoring application 483 of a client device 480, the controller 414 of the monitor control unit (onboard computer) 410, or the remote, back office server may identify geofences and off-limit locations based on a schedule. The size and location of geofences and off-limit locations may change based on time of day (e.g., the capture of sensor data such as images or video around the occurrence of an event may be more critical over a larger geographic range during the nighttime than during the daytime). In addition, whether geofences and off-limit locations are treated as non-alarm or alarm alerts may change based on time of day (e.g., an off-limit event during the daytime may trigger a non-alarm event, whereas the same off-limit event during the nighttime may trigger an alarm event, requiring the recordation of more images, video, or other sensor data). Further, the native monitoring application 442 may use scheduled location reporting to show moving asset location at various times in the day and later plot a path on a map through the native monitoring application 442 (e.g., a moving asset automatically reports coordinates every X minutes throughout daylight hours and every Y minutes throughout nighttime hours—where Y<X).

In some implementations, the native monitoring application 442 may combine a data feed from a security/sensor network installed in a fixed location, such as at a particular customer's location, in a freight yard, or at a truck stop, and the data provided by the sensors and/or optical recording devices 402, 404 mounted on the moving assets 420, 422, 424 (cargo containers), for more intelligent security monitoring, reporting, and alerting. For example, the native monitoring application 442 on a mobile device 440 may receive security/sensor data from the monitor control unit (onboard computer) 410 over the communication link 438 and/or may receive security/sensor data from a network at a fixed location that was previously uploaded to the remote, back office server 460 over network 405. In this example, the native monitoring application 442 may analyze the security/sensor data received from the monitor control unit 410 or the remote, back office server 460 in combination with data from the sensors and/or optical recording devices on moving assets 420, 422, 424 in performing security monitoring operations.

In some examples, users of a security monitoring system may be provided with unique codes and the equipment security system may be able to determine which of multiple users has requested monitored security data communications. The native monitoring application 442 may leverage the identification of the user in monitoring sensor data received from the moving assets. For instance, when a particular shipper employs the shipper's code to activate the equipment security system, or to select or configure dynamic script that specifies data gathering parameters, the native monitoring application 442 may begin monitoring moving assets associated with that particular shipper.

The native monitoring application 442 also may increase tracking frequency based on security system events. For example, the native monitoring application 442 may monitor, record, and upload data communications from sensors on an asset within a first geofence during a daylight period of time at a first frequency. When the asset leaves the first geofence, or during a nighttime period of time, the native monitoring application 442 may employ a dynamic script with instructions to monitor, record, and upload data communications from sensors on the asset at a second frequency that is faster than the first frequency. Because the native monitoring application 442 modifies frequency of recording and uploading data communications based on known factors that may increase the need for security monitoring, the native monitoring application 442 may conserve its own power, as well as the power of the various sensors and/or optical recording devices mounted on the assets.

The one or more client devices 480 may be any type of client devices (e.g., personal computers) that are capable of performing operations similar to those described as being performed by the one or more mobile devices 440. The one or more client devices 480 may operate a monitoring application 482 either locally or over a network. The monitoring application 482 may be similar to the native monitoring application 442 operated by the one or more mobile devices 440.

INDUSTRIAL APPLICABILITY

A method for monitoring a cargo container according to various exemplary implementations of this disclosure may employ one or more sensors or optical recording devices disposed on or inside the cargo container and configured to sense attributes of at least one of the container, cargo within the container, or an area that is one of inside the container or within a predetermined distance from the container. A monitor control unit or onboard computing device associated with a cargo container may be communicatively coupled with the one or more sensors or optical recording devices. The method may include receiving, at the onboard computing device, data communications from the one or more sensors or optical recording devices, and based on the received data communications, determining, with the computing device, whether an event has occurred at the cargo container.

As shown in the exemplary flowchart of FIG. 3 and the schematic representation of FIG. 4, data communications from various sensors or optical recording devices located on or in the vicinity of a cargo container may be received at an onboard computing device, a client device, a mobile device, or a back office server. For example, the data communications may include data from a door sensor at step 322, data from a GPS or other location determining device at step 324, and data indicating the identification of a particular object or activity within a cargo container as determined at step 326, for example, by computer vision analytics and/or machine learning in conjunction with an optical recording device such as an IR-CUT camera disposed within the cargo container. In the exemplary implementation, any one or more of an indication of an opened door to the cargo container at step 328, a geofence break at step 324, or an identified object or activity within the cargo container at step 326 may result in the selection or configuration of a particular dynamic script at step 332.

The method of monitoring equipment or cargo containers according to this disclosure may include determining, with a computing device of an onboard computer, a native monitoring application of a mobile device, or a monitoring application of a client device, a geofence associated with the cargo container, and based on at least one of a determination of whether an event has occurred at the cargo container, the determined geofence, or a type of data received from the one or more sensors or optical recording devices, performing at least one of selecting or configuring a dynamic script. The dynamic script may include software instructions that specify whether to begin recording an event occurring at or inside the cargo container, whether to record the event in an overwritable, local memory associated with at least one of the one or more sensors or optical recording devices, or the computing device, specify parameters that govern how data associated with the event will be recorded, and specify whether to upload the data from the overwritable, local memory to a remote server.

The method of monitoring equipment or cargo containers according to various exemplary implementations of this disclosure may include at least one of selecting or configuring the dynamic script that controls how monitored data is captured and recorded after receiving data from one or more of the one or more sensors or optical recording devices of the monitoring system. The received data may include at least one of an indication of an opening of a door to the cargo container, an indication of a location of the cargo container within a predetermined geofence, or an identification of a particular object or activity inside of the cargo container using computer vision analytics. For example, after selecting or configuring a particular dynamic script at step 332 in FIG. 3, a determination that the cargo container is located within a particular geofence at step 334 may initiate recording of the event at step 336.

Some implementations of the disclosed methods may include determining whether to record an event characterized by the data received from the one or more sensors or optical recording devices when the cargo container is located within a predetermined geofence. An exemplary method may still further include determining whether an identified event is an event characterized as a critical event when the cargo container is not located within a predetermined geofence. An event may be characterized as a critical event based on historical data that identifies a high probability of such event data leading to or occurring during a security event such as a theft, unauthorized tampering, or other detrimental effects on cargo contained within a cargo container. In such a case, as illustrated at step 340 of FIG. 3, an event characterized as a critical event may result in the recording of the event at step 342 even when the cargo container is not within a predetermined geofence generally identified as a geofence within which security data should be captured and uploaded to a back office server.

When a dynamic script calls for recording data communications from the various sensors and/or optical recording devices, whether this is because the cargo container is located within a particular geofence (step 334: YES), or because an event has been identified as a critical event (step 340: YES), an exemplary method may include determining whether any or all of the sensors and/or optical recording devices, such as external, wide angle lens cameras 64, 164, are configured for recording data in an overwritable, local memory (historical buffer) at step 344. A determination that a sensor or optical recording device is configured for recording data in a historical buffer (step 344: YES) may result in uploading the latest recorded data from a first period of time before the event occurs and a second period of time after the event begins to a permanent memory at a remote server, or to a memory of a client device or a mobile device at step 346. A determination that a sensor or optical recording device is not configured for recording data in a historical buffer (step 344: NO) may result in instructions from the dynamic script to begin recording new frames of image or video data at step 348. After a most recent period of time of data recorded in a historical buffer has been uploaded at step 346, instructions from the dynamic script may also result in the recordation of new frames of image or video data at step 352.

As further illustrated in the exemplary flowchart of FIG. 3, after data communications from a historical buffer of an external camera such as wide angle lens camera 64, 164 have been uploaded at step 344, providing an indication, for example, that a door to a cargo container has been opened, an internal camera such as an IR-CUT camera 62, 162 may begin recording activity within the cargo container at step 354. Even when no activity is detected by external cameras such as wide angle lens camera 64, 164, an internal camera such as an IR-CUT camera 62, 162 in conjunction with machine analytics may detect and identify an unauthorized entry into the cargo container. If any images are captured by the internal camera (step 356: YES) then individual frames of image data may be captured at step 362. When images are no longer being captured by the internal camera (step 356: NO) any images and/or video from a historical buffer associated with the internal camera may be uploaded at step 358 along with metadata identifying the captured data to a back office server, client device, or mobile device.

While certain features and embodiments of the disclosure have been described, other embodiments of the disclosure will be apparent to those skilled in the art from consideration of the specification and practice of the embodiments disclosed herein. Furthermore, although aspects of the present disclosure have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the disclosure.

It is intended, therefore, that the specification and examples be considered as exemplary only, with a true scope and spirit of the invention being indicated by the following claims and their full scope of equivalents.

What is claimed is:

1. An equipment security system, comprising:
   a remote server; and
   a monitoring system that is configured to monitor a cargo container, the monitoring system including one or more sensors disposed on or inside the cargo container and configured to sense attributes of at least one of the container, cargo within the container, or an area that is one of inside the container or within a distance from the container, and an onboard computer mounted on or in close proximity to the cargo container, wherein at least one of the remote server or the onboard computer is configured to:
   receive data communications from the one or more sensors,
   based on the data communications, determine whether an event has occurred at the cargo container,
   determine a geofence associated with the cargo container,
   based on at least one of the determination of whether an event has occurred, whether the cargo container is located within the determined geofence, or a type of data received from the one or more sensors, perform at least one of selecting or configuring a dynamic script, wherein the dynamic script includes software instructions that:
   specify whether to begin recording an event occurring at or inside the cargo container,
   specify whether to record the event in an overwritable, local memory, wherein the overwritable, local memory is associated with at least one of the one or more sensors or the onboard computer,
   specify parameters that govern how data associated with the event will be recorded, and
   specify whether to upload the data from the local memory to the remote server.

2. The equipment security system according to claim 1, wherein at least one of the remote server or the onboard computer includes a monitoring application configured to track and report geographic location data associated with the cargo container and whether the cargo container is located within the determined geofence.

3. The equipment security system according to claim 1, wherein the cargo container includes one of a shipping container, a rail car, a truck trailer, a straight truck, or an air cargo container.

4. The equipment security system according to claim 1, wherein the one or more sensors of the monitoring system comprise one or more of a wide angle lens camera disposed and configured to capture optical data occurring outside of the cargo container, an IR-CUT camera disposed inside of the cargo container and configured to capture optical data occurring inside of the cargo container under a range of lighting conditions, a door gap sensor configured to detect an opening of a door to the cargo container, and a GPS device configured to detect a geographical location of the cargo container.

5. The equipment security system according to claim 4, wherein at least one of the remote server or the onboard computer is configured to at least one of select or configure the dynamic script after receiving data from the one or more sensors of the monitoring system, wherein the received data includes at least one of an indication of an opening of a door to the cargo container, an indication of a location of the cargo container within the determined geofence, or an identification of a particular object or activity inside of the cargo container using computer vision analytics in conjunction with the IR-CUT camera.

6. The equipment security system according to claim 5, wherein the dynamic script includes software instructions to determine whether to record an event characterized by the data received from the one or more sensors when the cargo container is located within a predetermined geofence.

7. The equipment security system according to claim 5, wherein the dynamic script includes software instructions to determine whether the event is an event characterized as a critical event when the cargo container is not located within the predetermined geofence, and when the event is characterized as a critical event, begin recording the event.

8. The equipment security system according to claim 7, wherein the dynamic script includes software instructions that specify a first period of time for recording data before the event occurs in the overwritable, local memory, and a second period of time for recording data in the overwritable, local memory after the event begins.

9. The equipment security system according to claim 8, wherein the dynamic script includes software instructions to upload and transmit data associated with the event from the overwritable, local memory to the remote server, wherein the data includes at least one of data from the one or more sensors, or metadata identifying information about the data from the one or more sensors.

10. A cargo container security system, comprising:
a back office server;
one or more sensors disposed on or inside the cargo container and configured to sense attributes of at least one of the container, cargo within the container, or an area that is one of inside the container or within a predetermined distance from the container;
an onboard computer disposed in association with the cargo container; and
one or more client devices or mobile devices communicatively coupled to at least one of the one or more sensors, the onboard computer, or the back office server, wherein at least one of the onboard computer, the back office server, or the one or more client devices or mobile devices is configured to:
receive data communications from the one or more sensors,
based on the received data communications, determine whether an event has occurred at the cargo container,
determine a geofence associated with the cargo container,
based on at least one of the determination of whether an event has occurred at the cargo container, the determined geofence, or a type of data received from the one or more sensors, perform at least one of selecting or configuring a dynamic script, wherein the dynamic script includes software instructions that:
specify whether to begin recording an event occurring at or inside the cargo container,
specify whether to record the event in an overwritable, local memory, wherein the overwritable, local memory is associated with at least one of the one or more sensors, the onboard computer, or the one or more client devices or mobile devices,
specify parameters that govern how data associated with the event will be recorded, and
specify whether to upload the data from the overwritable, local memory to the back office server.

11. The cargo container security system according to claim 10, wherein at least one of the back office server, the onboard computer, or the one or more client devices or mobile devices includes a monitoring application configured to track and report geographic location data associated with the cargo container and whether the cargo container is located within the determined geofence.

12. The cargo container security system according to claim 10, wherein the cargo container includes one of a shipping container, a rail car, a truck trailer, a straight truck, or an air cargo container.

13. The cargo container security system according to claim 10, wherein the one or more sensors comprise one or more of a wide angle lens camera disposed and configured to capture optical data occurring outside of the cargo container, an IR-CUT camera disposed inside of the cargo container and configured to capture optical data occurring inside of the cargo container under a range of lighting conditions, a door gap sensor configured to detect an opening of a door to the cargo container, and a GPS device configured to detect a geographical location of the cargo container.

14. The cargo container security system according to claim 13, wherein at least one of the back office server, the onboard computer, or the one or more client devices or mobile devices is configured to at least one of select or configure the dynamic script after receiving data from one or more of the one or more sensors of the monitoring system, wherein the received data includes at least one of an indication of an opening of a door to the cargo container, an indication of a location of the cargo container within the determined geofence, or an identification of a particular object or activity inside of the cargo container using computer vision analytics in conjunction with the IR-CUT camera.

15. The cargo container security system according to claim 14, wherein the dynamic script includes software instructions to determine whether to record an event characterized by the data received from the one or more of the one or more sensors when the cargo container is located within a predetermined geofence.

16. The cargo container security system according to claim 14, wherein the dynamic script includes software instructions to determine whether the event is an event characterized as a critical event when the cargo container is not located within the predetermined geofence, and when the event is characterized as a critical event, begin recording the event.

17. The cargo container security system according to claim 16, wherein the dynamic script includes software instructions that specify a first period of time for recording data before the event occurs in the overwritable, local memory, and a second period of time for recording data in the overwritable, local memory after the event begins.

18. The cargo container security system according to claim 17, wherein the dynamic script includes software instructions to upload and transmit data associated with the event from the overwritable, local memory to the back office server, wherein the data includes at least one of data from the one or more sensors, or metadata identifying information about the data from the one or more sensors.

19. A method of monitoring a cargo container, wherein one or more sensors are disposed on or inside the cargo container and configured to sense attributes of at least one of the container, cargo within the container, or an area that is one of inside the container or within a predetermined distance from the container, and a computing device is communicatively coupled with the one or more sensors, the method comprising:
receiving, at the computing device, data communications from the one or more sensors,
based on the received data communications, determining, with the computing device, whether an event has occurred at the cargo container,
determining, with the computing device, a geofence associated with the cargo container,
based on at least one of the determination of whether an event has occurred at the cargo container, the determined geofence, or a type of data received from the one or more sensors, performing at least one of selecting or configuring a dynamic script using the computing device, wherein the dynamic script includes software instructions that:
specify whether to begin recording an event occurring at or inside the cargo container,
specify whether to record the event in an overwritable, local memory, wherein the overwritable, local memory is associated with at least one of the one or more sensors, or the computing device,
specify parameters that govern how data associated with the event will be recorded, and
specify whether to upload the data from the overwritable, local memory to a remote server.

20. The method according to claim 19, further including:
at least one of selecting or configuring the dynamic script after receiving data from one or more of the one or more sensors of the monitoring system, wherein the received data includes at least one of an indication of an opening of a door to the cargo container, an indication of a location of the cargo container within the determined geofence, or an identification of a particular object inside of the cargo container using computer vision analytics;

determining whether to record an event characterized by the data received from the one or more of the one or more sensors when the cargo container is located within a predetermined geofence;

determining whether the event is an event characterized as a critical event when the cargo container is not located within the predetermined geofence, and when the event is characterized as a critical event, begin recording the event;

specifying a first period of time for recording data before the event occurs in the overwritable, local memory, and a second period of time for recording data in the overwritable, local memory after the event begins; and uploading and transmitting data associated with the event from the overwritable, local memory to the remote server, wherein the data includes at least one of data from the one or more sensors, or metadata identifying information about the data from the one or more sensors.

* * * * *